United States Patent [19]

Staerzl

[11] Patent Number: 4,691,680
[45] Date of Patent: Sep. 8, 1987

[54] STARTING-ENRICHMENT CONTROL FOR A FUEL-INJECTED ENGINE

[75] Inventor: Richard E. Staerzl, Fond du Lac, Wis.

[73] Assignee: Brunswick Corporation, Skokie, Ill.

[21] Appl. No.: 865,852

[22] Filed: May 22, 1986

[51] Int. Cl.$^4$ .......................................... F02D 41/06
[52] U.S. Cl. ................................................. 123/491
[58] Field of Search ................. 123/491, 179 L, 179 G

[56] References Cited

U.S. PATENT DOCUMENTS

| | | | |
|---|---|---|---|
| 3,812,830 | 5/1974 | Traisnel | 123/179 L |
| 4,134,368 | 1/1979 | Hadley | 123/491 |
| 4,148,282 | 4/1979 | Grassle et al. | 123/179 L |
| 4,349,000 | 9/1982 | Staerzl | 123/491 |

FOREIGN PATENT DOCUMENTS

| | | | |
|---|---|---|---|
| 2829810 | 1/1979 | Fed. Rep. of Germany | 123/491 |
| 56-27064 | 3/1981 | Japan | 123/179 G |

Primary Examiner—Andrew M. Dolinar
Attorney, Agent, or Firm—Hopgood, Calimafde, Kalil, Blaustein & Judlowe

[57] ABSTRACT

The invention contemplates control circuitry applicable to an internal-combustion engine having electronic fuel injection, for fuel-priming upon cranking the engine to start the same. The circuitry is operative only when there is proper fuel pressure at the injectors, and the prime is immediate and simultaneous to all injectors. The duration of the prime is an inverse function of engine temperature. Once the priming fuel has been injected, there cannot be another priming injection until lapse of a period of time following completion of cranking, thus preventing engine-flooding in the event of a quick restart of the engine.

10 Claims, 4 Drawing Figures

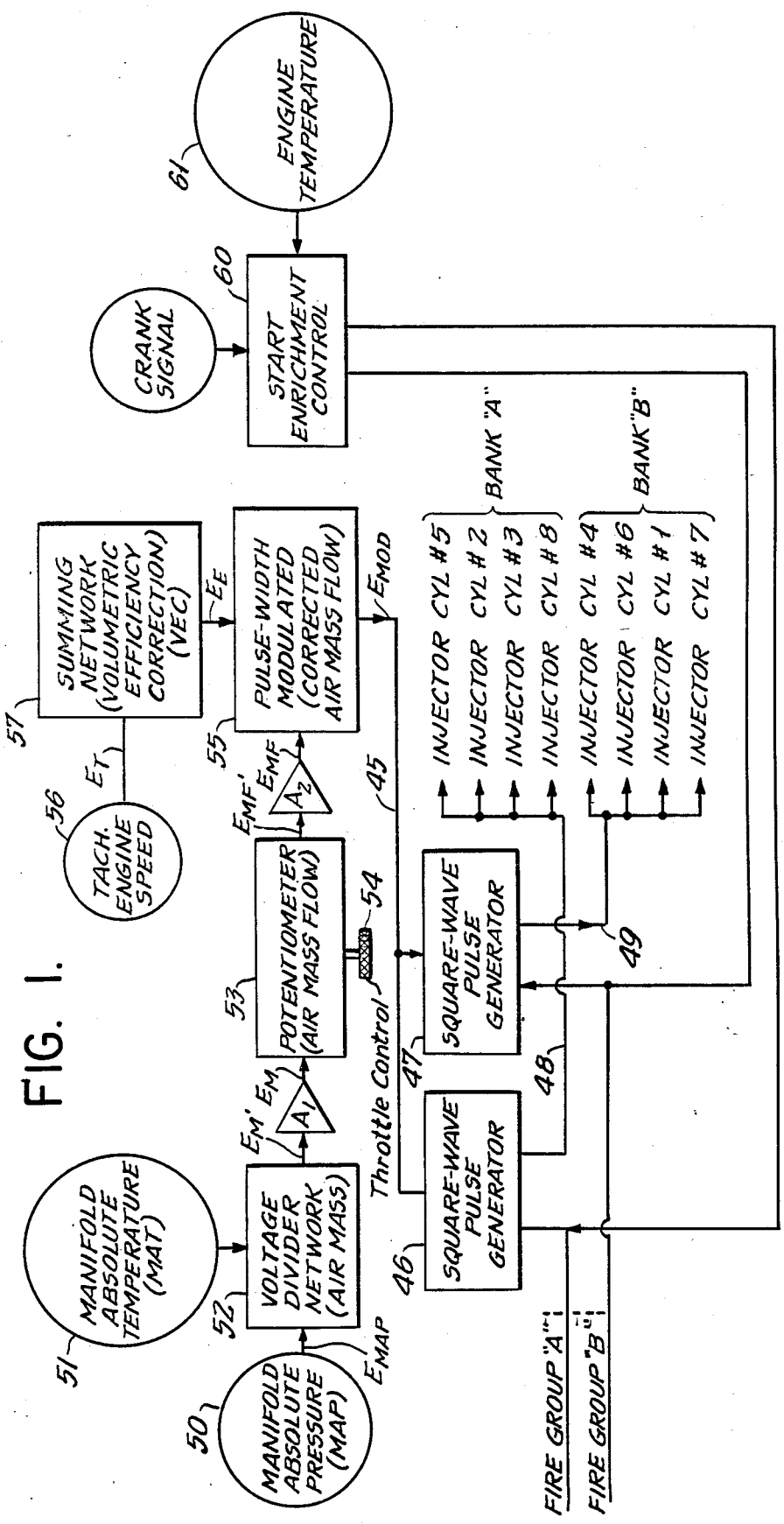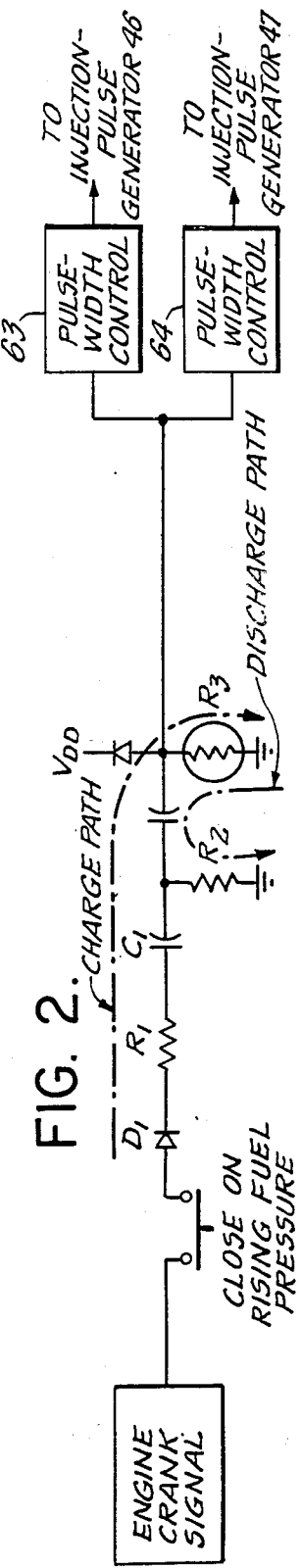
FIG. 1.
FIG. 2.

STARTING-ENRICHMENT CONTROL FOR A FUEL-INJECTED ENGINE

BACKGROUND OF THE INVENTION

The invention relates to fuel-enrichment control that is operative upon starting an internal-combustion engine having electronic fuel-injection. Such an engine and control circuitry for operation of its multiple fuel injectors are illustratively shown and described in my U.S. Pat. Nos. 4,305,351, 4,349,000 and 4,523,572, to which reference is made for detailed discussion.

It suffices to say that electronic fuel-injection engines, as well as carburetor-fed engines, must confront the problem of a cold start. In the carburetor-fed engine, one resorts to a manually operable choke or to an automatic choke, which merely determines how much the air supply is to be reduced in order to transiently enrich the mixture manifolded to the cylinders. But in the fuel-injected engine, the enrichment is by lengthening the pulses which operate the injectors; in this connection, it has been a practice to provide a fixed lengthened pulse, which is operative for a preset time, illustratively 15 to 30 seconds, should an engine temperature sensor determine that a cold start is involved. In another such practice, a stretched pulse (e.g., 3 times normal duration) is applied to each fuel injector as long as there is engine cranking.

Desirable as such fuel-enrichment devices may be, the fact is that they are wasteful of fuel, and if there is a reason for difficulty in starting the engine, each restarting attempt feeds excessive fuel to the cylinders, with resultant flooding, which only adds to the problem of starting the engine.

BRIEF STATEMENT OF THE INVENTION

It is an object of the invention to provide improved means, operable upon starting an electronically controlled fuel-injection engine, for transiently enriching the fuel flow in aid of starting.

A specific object is to meet the above object with electronic circuitry of basic simplicity, which is economical in its use of fuel, and which is specifically resistive against development of a flooded condition in the event of a quick restart.

Another specific object is to meet the above objects with engine-temperature sensitivity, whereby to achieve the enrichment that is appropriate to the temperature of the engine and to the time which has elapsed since the most recent running or attempted start of the engine.

A further specific object is to meet the above objects with circuitry that is compatible with the electronic fuel-injection control circuitry of the above-mentioned patents.

The invention achieves these objects using engine-priming circuitry which is operative only after the engine's fuel pump has achieved proper pressure. The prime is a single, immediate and uniform shot to each of the cylinders, wherein the duration of the shot is an inverse function of engine temperature. Once the single priming shot has been delivered to each of the cylinders, there can be no further priming injection until lapse of a period of time following completion of cranking, thus preventing an engine-flooded condition in the event of a quick restart of the engine.

DETAILED DESCRIPTION

The invention will be described in detail, in conjunction with the accompanying drawings, in which:

FIG. 1 is a diagram schematically showing components of an electronic fuel-injection control system for an internal-combustion engine, including a cold-start circuit of the invention embodied therein;

FIG. 2 is a diagram showing detail of the cold-start circuit of FIG. 1, with schematic indication of capacitor-charging and capacitor-discharging paths;

Figure 3:
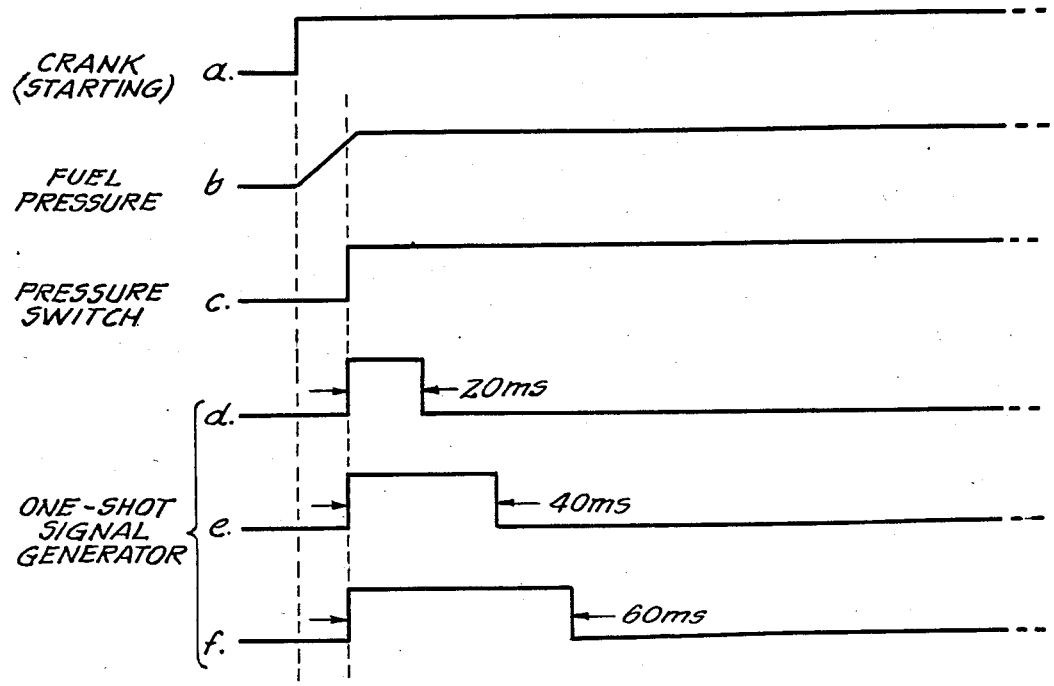
FIG. 3 is a set of curves to the same time scale, for illustration of the operation of the circuit of FIG. 2 to generate a timing signal for the single priming shot which is characteristic of the invention.

In my issued U.S. Pat. Nos. 4,305,351 and 4,349,000, the description of which is incorporated herein by reference, a fuel-injection control circuit is described in which one or more square-wave pulse generators drive solenoid operated injectors unique to each cylinder, there being a single control system whereby the pulse generator means is modulated as necessary to accommodate throttle demands in the context of engine speed and other factors. FIG. 1 herein is adopted from said U.S. Patents for purposes of simplified contextual explanation.

The control system of FIG. 1 is shown in illustrative application to a four-cycle eight-cylinder 90-degree V-engine wherein injectors for cylinders #5, #2, #3 and #8 (Bank "A") are operated simultaneously and (via line 48) under the control of the pulse output of a first square-wave generator 46, while the remaining injectors for cylinders #4, #6, #1 and #7 (Bank "B") are operated simultaneously and (via line 49) under the control of the pulse output of a second such generator 47. The base or crankshaft angle for which pulses generated at 46 are timed is determined by ignition-firing at cylinder #1, and pulses generated at 47 are similarly based upon ignition-firing at cylinder #3, i.e., at 180 crankshaft degrees from cylinder #1 firing. The actual time duration of all such generated pulses will vary in response to the amplitude of a control signal ($E_{MOD}$), supplied in line 45 to both generators 46-47, with a greater amplitude resulting in a pulse of greater duration.

The circuit to produce the modulating-voltage $E_{MOD}$ operates on various input parameters, in the form of analog voltages which reflect air-mass flow for the current engine speed, and a correction is made for volumetric efficiency of the particular engine. More specifically, for the circuit shown, a first electrical sensor 50 of manifold absolute pressure is a source of a first voltage $E_{MAP}$ which is linearly related to such pressure, and a second electrical sensor 51 of manifold absolute temperature may be a thermistor which is linearly related to such temperature through a resistor network 52. The voltage $E_{MAP}$ is divided by the network 52 to produce an output voltage $E_M$, which is a linear function of instantaneous air mass or density at inlet of air to the engine. A first amplifier A1 provides a corresponding output voltage $E_M$ at the high-impedance level needed for regulation-free application to the relatively low impedance of potentiometer means 53, having a selectively variable control that is symbolized by a throttle knob 54. The voltage output $E_{MF}$, of potentiometer means 53, reflects a "throttle"-positioned pick-off voltage and reflects instantaneous air-mass flow, for the instantaneous throttle (54) setting, and a second amplifier A2 provides a corresponding output voltage $E_{MF}$ for regulation-free application to one of the voltage-multiplier inputs of a pulse-width modulator 55, which is the source of $E_{MOD}$ already referred to.

The other voltage-multiplier input of modulator 55 receives an input voltage $E_E$ which is a function of engine speed and volumetric efficiency. More specifically, a tachometer 56 generates a voltage $E_T$ which is linearly related to engine speed (e.g., crankshaft speed, or repetition rate of one of the spark plugs), and a summing network 57 operates upon the voltage $E_T$ and certain other factors (which may be empirically determined and which reflect volumetric efficiency of the particular engine size and design) to develop the voltage $E_E$ for the multiplier of modulator 55. It is to be understood that although the fuel injection control circuit of FIG. 1 has been illustrated in connection with a four-cycle engine, the same circuit can be used in connection with a two-cycle engine.

The present invention is concerned with the problem of transient fuel-enrichment in aid of starting a fuel-injected engine, as of the nature just described. More particularly, an added circuit 60 in FIG. 1 is schematically indicated to be operated in response to the crank signal, i.e., battery voltage when the starter motor is operated; generally, for a conventional 12-volt system, the battery voltage can drop to something between 8 and 9 volts, in very cold and stiff conditions and, therefore, the cold-start circuitry to be described contemplates preferred design to an assumed operating level of approximately 8 volts. Legend in FIG. 1 further indicates engine-temperature sensing by means 61, for modifying operation of the enrichment-control circuit 60. The circuit 60 is shown with separate output connections to the respective injector-pulse generators 46–47.

FIG. 2 provides added detail for the circuit 60 of FIG. 1. The engine-crank signal is used initially to run the fuel-pump motor, whereby to build fuel pressure to a predetermined threshold of operating level, i.e., to a level at which any and all injectors will reliably deliver known shots of fuel for a given injection-pulse duration. A fuel-pressure operated switch monitors the building pressure and closes its contacts 62 upon attainment of the predetermined threshold. Closure of contacts 62 applies crank-signal voltage (e.g., 8 or 9 volts, in the event of a cold start) to charge a capacitor $C_1$, via a diode $D_1$ and a protective resistor $R_1$. Another diode $D_2$ is interposed between a reference voltage $V_{DD}$ (e.g., 8 volts) and the other side of capacitor $C_1$, whereby to establish a "clamp" level, e.g., to limit to 8 volts any voltage development delivered to each of two identical pulse-width control circuits 63–64. Each of the circuits 63 (64) may comprise a Schmidt trigger, operative to initiate an output signal to its associated injector-pulse generator 46 (47) when the input thereto exceeds a specified turn-on level, and to terminate its output signal when the input falls below a specified turn-off level. A relatively high resistance $R_2$ is determinative of relatively slow grounding discharge of capacitor $C_1$, and a relatively low resistance $R_3$ is sensitive to engine temperature, whereby the rate of capacitor ($C_1$) charging or discharging is a function of temperature; $R_3$ is suitably a thermistor, having a negative temperature coefficient of resistance. The values of indicated circuit elements may suitably be 1-K ohms at $R_1$, 10 megohms at $R_2$, 10 microforads at $C_1$, and a temperature-sensitive range of $R_3$-resistance variation centered at 25-K ohms.

The curves of FIG. 3 are helpful in explaining a fuel-enriching engine start, using the circuit of FIG. 2. In curve a, the crank signal is seen to rise to a steady maximum, at the instant 65 of exciting the starter motor; this maximum is assumed to be in the range 8 to 9 volts for a cold start, and only the fuel-pump motor is energized, to develop rising fuel pressure to the injector system, as indicated by curve b, at 66. Shortly before reaching the maximum pressure deliverable by the fuel-pump system, a pressure threshold 67 is crossed, involving closure of the pressure-switch contacts 62 (curve c).

Since a cold start is involved, it will be understood that any prior charge on capacitor $C_1$ will long since have leaked to ground, so that upon closure of switch contacts 62, the full crank-signal voltage is applied to charge capacitor $C_1$; as a result, a transient current through resistor $R_3$ will be transiently observable at point X as a voltage input to the respective pulse-width control circuits 63. If the engine were "hot", the resistance at $R_3$ will be low, and the voltage developed by the charging current could substantially exceed 8 volts, but for the illustrative reference value at $V_{DD}$, the maximum input to control circuits 63–64 reflects clamping to the 8-volt level. On the other hand, for the assumed cold-start situation, it will be understood that, even though the engine temperature of $R_3$ exposure is cold, the resistance at $R_3$ will still allow development of substantially 8 volts for turning-on the Schmidt triggers at 63–64. This turn-on event is shown at curves d, e and f of FIG. 3 to occur at essentially the instant 67 of closure of switch contacts 62.

The legend applicable to curves d, e and f of FIG. 3 will be understood to apply to each of the controls 63 (64), in conjunction with its associated square-wave pulse generator 46 (47), and the varying length of square-wave pulses depicted at curves d, e and f will be understood to reflect the different lengths of time for which the transient voltage across $R_3$ is operative for turn-on and for turn-off of the respective Schmidt triggers. Thus, for the "cold" situation, in which $R_3$ is relatively high, the transient $C_1$-charging current through $R_3$ will be relatively long, the same being illustratively depicted at the relatively long (60-ms.) pulse of curve f. Similarly, for the relatively "hot" situation, in which $R_3$ is relatively low, the transient $C_1$-charging current through $R_3$ will be relatively short, giving rise to the relatively short (20-ms.) pulse of curve d. And curve e depicts the intermediate sensed-temperature situation, with an intermediate-length (40-ms.) pulse.

It should be noted that whatever the enrichment-pulse length determined by the circuit of FIG. 2, there is but a single such pulse generated, and that this single pulse is operative only once (and for a full pressure of available fuel) to assure that each cylinder receives the same initial injection of priming fuel. As long as cranking continues, there can be no further generation of a priming signal. But experience to date indicates that with the illustrative values given above, the engine can be reliably started on the first try, over a relatively wide range of cold-start temperatures, i.e., without requiring a restart attempt.

In the event that a re-start is required, e.g., in the event of a stall-out shortly after initially starting the engine, the circuit of FIG. 2 provides a further feature of preventing and/or suitably modifying the pulse-width control to assure against engine-flooding. This feature is appreciated from further discussion of FIG. 2 in conjunction with the curves of FIG. 4.

Figure 4:
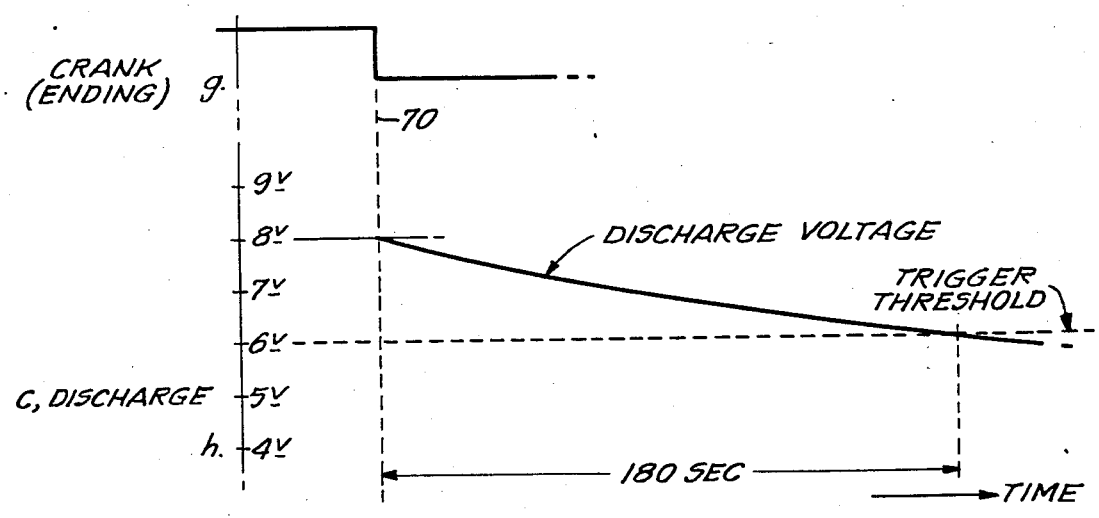
FIG. 4 is another set of curves, to a different time scale, for illustration of the operation of the circuit of FIG. 2 to prevent development of an engine-flooded condition.

As curve g of FIG. 4 illustrates, the flood-prevention feature initiates at the instant 70 of terminating the cranking signal, thus leaving the charge at $C_1$ to leak slowly to ground via resistor $R_2$, as slightly modified by the temperature-responsive resistance at $R_3$. Because $R_3$ will always be much greater than $R_2$, its effect on the discharge rate of $C_1$ will be insignificant.

The curves of FIG. 4 thus indicate that if a restart of engine cranking is initiated within 60 seconds of the end of prior cranking, the charge on capacitor $C_1$ will still be 6 volts for the "HOT" condition, and greater than 6 volts for any other temperature condition. This being the case, the re-start cranking signal will be confronted with a substantially charged capacitor $C_1$, so that to elevate the charge will involve only a small increment, which increment will be insufficient to produce enough voltage drop across $R_3$, for initiation (i.e., turn-on) of either of the Schmidt triggers. In other words, only when capacitor $C_1$ has been sufficiently discharged prior to a re-start can there be enough of a capacitor ($C_1$) charging current to give rise to a turn-on of the Schmidt triggers; and, without Schmidt-trigger operation at 63 (64), there can be no fuel-enrichment upon restarting.

It should also be noted that even when there has been a sufficient period of lapse time (after end of a crank signal and to the time of a re-start crank signal) in which to have so discharged capacitor $C_1$ as to give rise to a Schmidt-trigger turn-on, the fact that the discharge was less than complete means that the turned-on Schmidt-trigger pulse cannot be as long as it was for the first cold-start cranking. This fact will be recognized as a further feature, reducing the chance of engine-flooding.

The described invention will be seen to meet the stated objectives. Fuel-enrichment is achieved on a one-shot basis of priming all cylinders, i.e., only once, for each engine cranking, the prime being appropriate to sensed engine temperature, and with protection against engine-flooding in the event of a quick restart. Essentially two time-constants are operative in any given start cycle of the invention (and for any given sensed engine temperature), namely, (a) the relatively short time constant involving resistor $R_3$ and capacitance $C_1$, for determining the turn-on to turn-off time of the Schmidt-triggers, and (b) the relatively long time constant, involving resistors $R_2$ and $R_3$ and capacitor $C_1$, for determining $C_1$ leakage to ground, once a cranking signal has ended.

While the invention has been described in detail for a preferred embodiment, it will be understood that modifications may be made without departing from the spirit and scope of the invention. For example, the Schmidt trigger is a convenient device for generating the temperature-responsive time-out of enrichment fuel-injection pulses, but other circuitry such as a bi-stable one-shot multivibrator, in conjunction with a sample-and-hold device (e.g., sampling peak voltage across $R_3$) and an R-C timer, may achieve an equivalent control of pulse width.

What is claimed is:

1. In a multi-cylinder internal-combustion engine having a starter-operated fuel pump and an electronically controlled fuel-injection system wherein a pulse generator provides fuel-injection control pulses of time duration proportioned to desired throttle setting among other factors, the pulses each having a duration which is at all times a small fraction of the duration of a full cycle of operation of a given cylinder of the engine, and wherein engine-cranking starter-operated means are operative upon starting the engine to temporarily enrich the fuel supplied to the engine by temporarily providing fuel-injection control pulses of greater time duration than that which applies for maximum throttle setting, the improvement in which the starter-operated means includes: (1) pressure-sensitive means which is responsive to pumped fuel pressure to delay generation of any greater-duration pulses until sensed achievement of a predetermined adequate level of fuel-injection pressure, whereby engine-priming is initiated only with adequate fuel pressure, (2) means limiting engine-priming to a single priming pulse of relatively great duration for each cylinder for any given continuous period of engine cranking, (3) temperature-sensitive means which is responsive to engine temperature to determine the duration of said single priming pulse as an inverse function of sensed engine temperature, and (4) time-delay means responsive to an engine-priming operation of said pressure-sensitive means to determine a further delay period in which the generation of any greater-duration pulse is materially suppressed, whereby the danger of engine-flooding is avoided or substantially reduced for attempted starting within said further delay period.

2. Circuit means for transient fuel-priming enrichment of a fuel-injected internal-combustion engine, comprising a capacitor having an input terminal with a relatively high leakage-resistance connection to ground and an output terminal with a relatively low leakage-resistance connection to ground, said relatively low resistance connection having a negative temperature coefficient of resistance and adapted to reflect current engine temperature, means including a threshold-operated switch responsive to achievement of a predetermined threshold of fuel-pressure for applying an engine-cranking signal to said input terminal, whereby transient capacitor-charging current through and transient voltage across said relatively low resistance connection will be an inverse function of current engine temperature, and fuel-enriching injection-pulse generator means operated by said transient voltage for generating a single pulse of unusually great duration for a single prime of all cylinders of the engine, said single pulse being of duration inversely related to current engine temperature.

3. Circuit means according to claim 2, in which said means for applying said signal to said input terminal includes a series-connected diode and protective resistor.

4. Circuit means according to claim 2, in which clamping means are provided at said output terminal for limiting to a predetermined maximum voltage the level of voltage applicable to said pulse-generator means.

5. Circuit means according to claim 2, for particular application to a V-type engine having two banks of cylinders, wherein said pulse-generator means is one of two, each pulse-generation means having an output connection to uniquely serve the injectors of its single one of said banks of cylinders.

6. Circuit means according to claim 2, in which said relatively high resistance connection is at least two orders of resistance magnitude greater than said relatively low resistance connection.

7. Circuit means according to claim 2, in which said capacitor is in the order of 10 microforads, said relatively high resistance connection is in the order of 10 megohms, and said relatively low resistance connection is in the order of 25-K ohms.

8. Circuit means according to claim 2, in which said relatively low resistance connection includes a thermistor element.

9. Circuit means according to claim 2, in which said pulse-generator means is a Schmidt trigger.

10. Circuit means according to claim 4, in which said predetermined maximum voltage is about 8 volts.

* * * * *